United States Patent [19]
Weszely

[11] Patent Number: 5,489,741
[45] Date of Patent: Feb. 6, 1996

[54] TREATMENT AND STABILIZATION OF HAZARDOUS WASTE

[75] Inventor: Ronald R. Weszely, Chicago, Ill.

[73] Assignee: Applied Innovations, Inc., Palos Park, Ill.

[21] Appl. No.: 222,017

[22] Filed: Apr. 4, 1994

[51] Int. Cl.6 .................. A62D 3/00; G21F 9/36
[52] U.S. Cl. .................... 588/257; 405/128; 588/256; 588/901
[58] Field of Search ...................... 588/249, 252, 588/255, 256, 257, 901; 405/128

[56] References Cited

U.S. PATENT DOCUMENTS

| | | | |
|---|---|---|---|
| 4,142,912 | 3/1979 | Young | 588/901 X |
| 5,285,000 | 2/1994 | Schwitzgebel | 588/256 |
| 5,370,478 | 12/1994 | Bartlett et al. | 405/128 |
| 5,372,729 | 12/1994 | Hooykaas | 588/256 X |

*Primary Examiner*—George A. Suchfield
*Attorney, Agent, or Firm*—Stephen W. White

[57] ABSTRACT

A composition and process for the safe removal and treatment of hazardous waste material is described. This composition is a mixture of grout like cement containing the hazardous waste and a minor amount of an alkali metal silicate and a gelling agent. The hazardous waste is then safely contained within the resulting cementitious material and can be safely disposed by burial, for example. The contaminated wastes are contained within the block and will not be exposed by regular soil actions. This composition and process is particularly useful for treating soil contaminated by low level radioactive materials.

13 Claims, 1 Drawing Sheet

TREATMENT AND STABILIZATION OF HAZARDOUS WASTE

BACKGROUND OF THE INVENTION

1. Field of the Invention

This invention relates to a composition and a method for the treatment and stabilization of hazardous wastes so that they may be safely disposed or discarded in an environmental manner. Specifically, this invention relates to a composition and a method for the stabilization of hazardous radioactive wastes. Still more specifically, this invention relates to a composition and a method for the stabilization of low level radiation contaminated soil. Even more specifically, this invention relates to a composition and a method for encapsulating low level radiation contaminated soil so that said encapsulated soil may be safely disposed.

2. Description of the Prior Art

There are a host of hazardous waste materials that are difficult to dispose because of the possibility that they may contaminate the environment. These hazardous wastes include things like dioxins; polychlorobiphenyls; wastes containing heavy metals and the like; waste from sewage treatment plants; radioactive wastes such as that contained in contaminated soil or effluents from radiation producing plants and the like; and chemical wastes, among many others. As there are wastes generated by society, so there are processes described in the prior art that are said to either remove or stabilize these hazardous elements so that they can be safely disposed. Most of these processes are either too complicated to be economical or do not safely stabilize the hazardous wastes so that can safely be disposed environmentally.

It is said that hazardous waste products such as chemical precipitation sludges; waste ion exchange materials; metal cuttings, among others, can be stored in metal or plastic containers or mixed with a cement and then buried stored in the resulting cement container. Metal or plastic container storage is unsatisfactory since it is known that such containers can deteriorate with age and thus there is usually some leaking of the hazardous waste. Storage of hazardous waste materials embedded in cement has been somewhat successful but cement does not have good setting properties when mixed with most hazardous wastes. The containment of radioactive wastes within a cement matrix has also been reported. This too has been unsuccessful due to the poor mixing properties of cement and waste. Additionally, during the curing phase, the cement is known to form micro-channels and thus the radiation can leak through these channels into the environment.

It is also known to treat soil containing lead with a mixture of silicates. This process is said to effectively reduce the amount of detected lead in the soil by encapsulating the lead containing soil within a matrix of the silicate. Although this process has been tested successfully for lead in soil, it has not been used for the other commonly known wastes such as those listed above. In addition, considerable amounts of the silicate mixture must be used and this is costly.

Finally, it is also known to treat radioactive or toxic solid wastes with a polymerizable mixture of a styrene compound or mixtures of styrenes. It is said that large, solid blocks of this material are safe to handle and dispose. However, aging of this material is a problem and most styrene containing compounds are hazardous in and of themselves.

SUMMARY OF THE INVENTION

It is an object of this invention to provide a composition in which hazardous wastes can be safely contained and then disposed. Another object of this invention is to provide a quick and convenient process for the treatment and disposal of hazardous wastes. Yet another object of this invention is to provide both composition and method or processes for the safe containment and disposal of radioactive wastes. These and yet other objects are achieved in a mixture comprising, in parts by weight, of 0 to 50 parts sand, 5 to 25 parts cement, 2.5 to 18.75 parts water, 12.5 to 75 parts of hazardous waste, and minor amounts of an alkali metal silicate and a gelling agent.

In a continuous process for the treatment and stabilization of hazardous wastes comprising the steps of intimately mixing 0 to 50 parts by weight of sand, 5 to 25 parts by weight of cement, 2.5 to 18.75 parts by weight of water, 12.5 to 75 parts by weight of hazardous waste, a minor amount of an alkali metal silicate and a minor amount of a gelling agent, allowing this mixture to harden in a format suitable for safe disposal thereof.

DETAILS OF THE INVENTION

Figure 1:
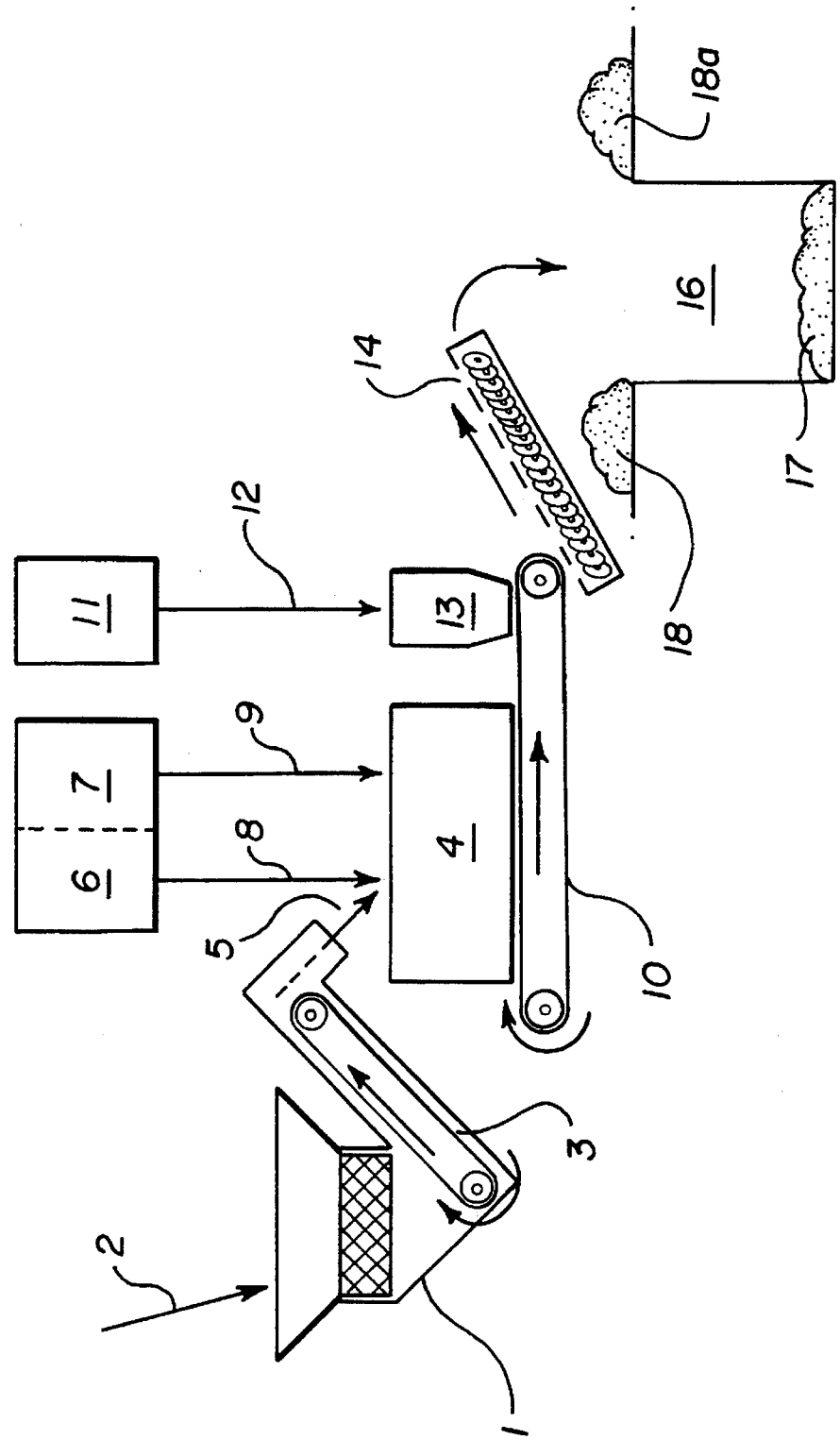
FIG. 1 is a schematic drawing of the process of this invention.

Looking now specifically at FIG. 1 which is a schematic illustration of the process of this invention, shows a portable system for the safe disposal of contaminated material. In this figure, the contaminated material is added to a screener 1 via any method available, such as a front end loading device, for example. This material is shown being added at arrow 2. The material is then fed by a conveyor belt 3 and is then dropped into a continuous mixer 4 as shown by arrow 5. Sand (optional) and cementitious material are then added from bins 6 and 7 as shown by arrows 8 and 9. This mixture is then carried by a conveyor belt 10 to the remainder of the processor. Simultaneously, the other ingredients (e.g. the alkali metal silicate and the gelling agent and the water) are added from source 11 via arrow 12 to another tank 13. This material also is carried by the conveyor belt to a continuous mixing auger 14 and the total mixture then falls into a pit 16 and is shown being accumulated at 17. When all of the hazardous material has been treated in this manner and dropped into the pit, the pit may be covered by dirt or other covering materials shown as 18 and 18a. It should be here noted that this is simply a schematic drawing or flow sheet of the process of this invention. When actually in use, there are a myriad of tanks and bins to hold or contain the various ingredients desired to form the mixture that can contain and safely dispose of the hazardous waste.

In a particular example wherein low level contaminated soil is being treated, this soil is excavated using a conventional back hoe, for example, and the soil is then screened and pulverized down to fines (e.g. ¼ inch in size). This material is then fed into a continuous mixing device that has been taken directly to the site. This device dispenses the cement, sand, water, silicate and gelling agent to this hazardous waste in exactly the desired proportions as previously determined by laboratory tests. The dry ingredients are first layered and then taken by an internal conveyor belt to the rotating auger where water and the final ingredients are added. All of this mixing action is of the high sheer type. The flow of all components are constantly monitored as they are processed by the continuous mixer. The mixed material is then discharged out the opposite end of the mixing auger directly into a burial pit. Alternatively, these materials may be discharged in a transfer pit where a front end loader can pick up the processed material and move it to a final placement area. The placement of the stabilized material, either temporary or final, is simply a matter of choice. The stabilized hazardous material within this pit can then be covered over with the existing clean soil that was previously excavated from this pit.

Other systems for the complete mixing of the ingredients of this invention so as to form the resulting, impervious block containing the hazardous wastes, may also be used within the ambit of this invention. The processes shown and particularly described herein are only considered to be the best mode known at the time of this filing.

To fully understand the problems of the prior art that this invention solves, one must know that discarded hazardous materials are an environmental nightmare. There are a host of these materials known in the art and these include many chemicals, wastes from chemical plants, sewage sludge, heavy metals and radioactive materials, to name a few. It is essential that the public is able to safely contain and dispose of these materials in an efficient and environmentally safe manner. Among the most important of these hazardous wastes are those that are radioactive. There are a myriad of places in which low-level radioactive wastes have contaminated the soil and it is imperative to safely contain and dispose of these products.

Prior art elements and processes, including those that use a cement matrix to contain these materials, will not function correctly. I have found that it is possible to safely contain hazardous wastes, including the radioactive wastes, in a cement matrix when the cementitious materials and the waste are simultaneously mixed with a silicate and a gelling agent. The composition of this invention, along with the associated process, works most conveniently with low level radioactive contaminated soil, although any of the conventional hazardous wastes mentioned herein, will work with this composition just as well.

Within the working ambit of this invention, I will assume that there are between 2,500 to 4,500 pounds within a yard of cementitious material. Using a typical yard of cement, 200 to 1,000 pounds (5 to 25%) is cement; 500 to 3,000 pounds (12.5 to 75%) is hazardous waste; 100 to 750 pounds (2.5 to 18.75%) is water; and 0 to 2,000 pounds (0 to 50%) is sand. Within this mixture, 0.1 to 1.0 gallons of silicate (as a 40% aqueous solution) and 0.5 to 3.0 gallons of a gelling agent (0.5 to 4.0% solids in an aqueous solution) are then added. In a particularly preferred embodiment, the composition of this invention, assuming 4,000 pounds per yard of cementitious material, will contain 400 to 800 pounds (10.0 to 20.0%) of cement, 1500 to 2,500 pounds (37.5 to 62.5%) of hazardous waste, 200 to 400 pounds (5.0 to 10.0%) of water, 0 to 1,000 pounds (0 to 25%) of sand, 0.25 gallons to 0.75 gallons (most preferred is 0.5 gallons) of the aforementioned silicate and 1.0 to 2.0 gallons (most preferred 1.25 to 1.75 gallons at 1.5% solids) of the gelling agent. All of this is per yard of cementitious material.

To prepare a cementitious block or unit of material which will contain the hazardous waste to be disposed in a safe and convenient method, I prefer using a mixing device that is continuous in nature, as previously described. These devices are conventional and well-known in the cement mixing art. The hazardous waste material or materials and the sand (if necessary) are volumetrically proportioned into the device. Preferable, dry, Portland-type cement is then added. The cement may be any of the well-known types of Portland cement, such as Types I, II, III, IV or V. There are a myriad of other cements, some of the rapid-setting type, available in the prior art and all will function adequately within the metes and bounds of this invention. The aforementioned waste, sand and cement are all relatively dry and these are then conveyed together to the auger mixing device (e.g. a high sheer auger mixer), where water is immediately added. The silicate and the gellant may be added along with the water in some instances. In other instances where, for example, acid may be added to the water to help reduce the pH of the final product, the gellant and silicate may be added separately some distance down the mixing auger (prefer 1–4 feet). This then allows the initial mixing of ingredients to take place prior to the addition of gellant and silicate and will prevent any side reaction with the acid from occurring. There may be other times when the addition of the gellant and silicate may occur further down the mixing auger (e.g. 7 to 9 feet) to help blend a particular hazardous waste stream.

A number of commercially available alkali metal silicates are available in the prior art and most will work within the metes and bounds of this invention. These silicates include sodium and potassium silicates of varying viscosity's and ratios of alkali metal to silicate. I prefer using a potassium silicate. In particular, a potassium silicate with 8.3% $K_2O$ and 20.8% $SiO_2$, with a viscosity of 40 cps and a pH of 11.3, sold by PQ Corporation of Valley Forge, Pa. as KASIL®-1. It is thought that as the hazardous waste material is dispersed thoroughly throughout the grout-cement matrix, this dispersion of hazardous waste is then coated with the alkali metal silicate which forms a so-called shell (encapsulate) about the particles of hazardous waste. This encapsulation of the hazardous waste within a cement matrix is very surprising. Since these silicates are infinitely dispersible within the grout-cement mixture, they are totally compatible with this material and cause no problem in the total mix. As previously mentioned, it is thought that the silicate covering forms a hard, impervious shell around the hazardous waste thus encapsulating this material within the grout-cement mixture.

The grout-cement containing the silicate treated hazardous waste material, may be allowed to harden into a block that can be disposed. However, the lightest material, and the one with the lowest specific gravity within a grout-cement mixture is the water. Immediately after mixing, a predictable phenomena occurs. The free water in the mix begins to squeeze in an upward movement, displaced by the weight of the other materials in the mix, which are of a higher specific gravity. As the water moves upward within the mix, so does the entrapped and entrained air present therein. This rising air is thought to create and form micro-capillary tubes within the forming grout-cement. These capillary tubes appear to be about 20 to 30 microns in diameter. Any free, hazardous waste present within the mix may travel to the surface of the hardening grout-cement inside of these capillary tubes. Thus, even though a large amount of the hazardous waste is contained deep within the block of cement, some can be entrained and move upwards to the surface through these capillary tubes. This is highly undesirable and perhaps represents what has been missing in the prior art.

To counteract this migration/capillary action and formation theory, one should be able to create a gel-like quality to the free water contained within this mix. To accomplish this stage, I add a gelling agent to the grout-cement, silicate encapsulated hazardous waste matrix. Gelled free water in this matrix does not move. Since there is no water movement, no capillary action takes place and the grout-concrete/ silicate containing hazardous waste matrix becomes a closed cell system. No hazardous waste will find its way through this system and will remain entombed within the dried material on curing. Additionally, a gelling agent will also act as an integral curing agent and thus dramatically improve the quality of the hardened grout-cement. Free water gelling agents useful within the ambit of this invention are legion in number and include hydroscopic chemicals including guars, bentonite, naturally occurring celluloses (e.g. methyl cellulose), water soluble polymers derived from cellulose (e.g. cellulose ethers), among others. Most of these compounds are infinitely miscible with cementitious materials and are highly efficient water retention agents.

It is surmised that the silicate starts forming a permanent shell around the contaminated material when contacted thereby. It is thought that the heat of curing, primarily due to the grout-cement reaction, will harden and create a glass-like capsule. When fully cured (usually within 24 to 48 hours, depending on ambient conditions) it should then permanently isolate the hazardous waste, including radioactive materials, which then appear to be impervious to all naturally occurring soil reactions. The block of cementitious material containing the so-called encapsulated hazardous materials can be safely disposed by burial. The burial pit may be lined or unlined and may then be covered with soil or other cementitious material for further surface use. Alternatively, the cementitious material containing the hazardous wastes may be disposed by other, conventional methods for disposal, such as land-filling, dumping or underground storage, for example.

This stabilized material complexes many of the commonly available hazardous materials or toxins known and present in contaminated soil. This complex appears to be stable to many of the known processes which have leached out this contaminants from a cementitious matrix in the past. The entire process can be carried out in situ which is highly advantageous. The movement of equipment from contaminated site to contaminated site is also advantageous since the hazardous material does not need to be moved in and of itself. The contaminated material is thus lifted in place, treated and can be safely returned to the same place in a proper burial pit, for example. There are a host of chemicals, toxins, heavy metals, chemical wastes, radioactive wastes, etc. that can be efficaciously treated using the novel elements and process of this invention. The ratio of cementious material and other ingredients can be balanced according to the type of hazardous material to be treated by my invention. These ratios of elements can be easily determined by laboratory testing before going into the field to remove, treat and stabilize that particular hazardous waste. Thus, a wide range of ingredients is envisioned within the metes and bounds of this invention.

I claim:

1. A composition for the treatment and stabilization of hazardous wastes comprising a mixture, in parts by weight, of 0 to 50 parts sand, 5 to 25 parts cement, 2.5 to 18.75 parts water, 12.5 to 75 parts of hazardous waste, and minor amounts of an alkali metal silicate and a gelling agent.

2. The composition of claim 1 wherein said alkali metal silicate is sodium or potassium silicate.

3. The composition of claim 2 where in said alkali metal silicate is a 40% solids containing aqueous material and is comprised of 8.3% $K_2O$ and 20.8% $SiO_2$, with a viscosity of 40 cps and a pH of 11.3.

4. The composition of claim 1 wherein said mixture has a weight of between 2,500 pounds to 4,500, said total weight comprising a cubic yard, wherein said ingredients are present as 0 to 2000 pounds of sand, 200 to 100 pounds of cement, 500 to 3000 pounds of hazardous waste, 100 to 750 pounds of water, and, wherein 0.10 to 1.0 gallons per cubic yard of a 40% aqueous solution of and alkali metal silicate and 0.5 to 3.0 gallons per cubic yard of a gelling agent are added thereto.

5. The composition of claim 4 wherein said silicate is a potassium silicate and is added in an amount of 0.25 gallon to 0.75 gallon per yard of total mixture.

6. The composition of claim 1 wherein said gelling agent is a hydroscopic gelling agent selected from the group consisting of guar, a bentonite, naturally occurring celluloses, and water soluble polymers derived from cellulose.

7. The composition of claim 4 wherein said gelling agent is a methyl cellulose and is added in an amount of 1.0 gallon to 2.0 gallon per yard of total mixture.

8. The composition of claim 4 wherein said cement is a fast setting cement.

9. The composition of claim 1 wherein said hazardous wastes are taken from the group consisting of dioxins, polychlorobiphenyls, wastes containing heavy metals, waste from sewage treatment plants, radioactive wastes, and chemical wastes.

10. A method for the treatment and stabilization of hazardous wastes comprising the steps of adding 0 to 50 parts sand, 5 to 25 parts cement, 2.5 to 18.75 parts water, 12.5 to 75 parts of hazardous waste, and minor amounts of an alkali metal silicate and a gelling agent.

11. The method of claim 10 wherein said hazardous waste is taken from the group consisting of dioxins, polychlorobiphenyls, wastes containing heavy metals, waste from sewage treatment plants, and radioactive wastes.

12. The method of claim 11 wherein said hazardous waste is soil contaminated with low level radioactive waste.

13. A continuous process for the treatment and stabilization of hazardous wastes comprising the steps of intimately mixing 0 to 50 parts by weight of sand, 5 to 25 parts by weight of cement, 2.5 to 18.75 parts by weight of water, 12.5 to 75 parts by weight of hazardous waste, and minor amounts of an alkali metal silicate and a gelling agent, allowing this mixture to harden wherein when said mixture is in a hardened form said hazardous waste is in a format suitable for safe disposal thereof.

* * * * *